(12) United States Patent
Mori

(10) Patent No.: US 10,715,740 B2
(45) Date of Patent: Jul. 14, 2020

(54) IMAGE PROCESSING DEVICE, DRIVE SUPPORTING SYSTEM, AND IMAGE PROCESSING METHOD

(71) Applicants: KABUSHIKI KAISHA TOSHIBA, Tokyo (JP); TOSHIBA ELECTRONIC DEVICES & STORAGE CORPORATION, Tokyo (JP)

(72) Inventor: Tatsuya Mori, Arakawa Tokyo (JP)

(73) Assignees: KABUSHIKI KAISHA TOSHIBA, Tokyo (JP); TOSHIBA ELECTRONIC DEVICES & STORAGE CORPORATION, Tokyo (JP)

(*) Notice: Subject to any disclaimer, the term of this patent is extended or adjusted under 35 U.S.C. 154(b) by 42 days.

(21) Appl. No.: 16/118,157

(22) Filed: Aug. 30, 2018

(65) Prior Publication Data

US 2019/0297246 A1 Sep. 26, 2019

(30) Foreign Application Priority Data

Mar. 20, 2018 (JP) .................................. 2018-052933

(51) Int. Cl.
*H04N 5/235* (2006.01)
*G06T 5/00* (2006.01)
*G06T 5/50* (2006.01)
*H04N 9/73* (2006.01)

(52) U.S. Cl.
CPC ........... *H04N 5/2355* (2013.01); *G06T 5/007* (2013.01); *G06T 5/50* (2013.01); *H04N 5/2353* (2013.01); *H04N 9/735* (2013.01); *G06T 2207/10144* (2013.01); *G06T 2207/20208* (2013.01); *G06T 2207/20221* (2013.01)

(58) Field of Classification Search
CPC .... H04N 5/2355; H04N 5/2353; H04N 9/735; G06T 5/007; G06T 5/50; G06T 2207/10144; G06T 2207/20208; G06T 2207/20221

See application file for complete search history.

(56) References Cited

U.S. PATENT DOCUMENTS

| 8,947,555 | B2 | 2/2015 | Velarde et al. | |
|---|---|---|---|---|
| 8,965,120 | B2 | 2/2015 | Yamanaka | |
| 9,749,546 | B2 | 8/2017 | Matsunaga | |
| 2012/0262600 | A1* | 10/2012 | Velarde | H04N 5/2355 348/223.1 |
| 2013/0235193 | A1* | 9/2013 | Chang | H04N 9/73 348/143 |
| 2017/0019579 | A1* | 1/2017 | Matsunaga | H04N 9/735 |

FOREIGN PATENT DOCUMENTS

JP 2014-109710 A 6/2014

* cited by examiner

*Primary Examiner* — Nhan T Tran
(74) *Attorney, Agent, or Firm* — Kim & Stewart LLP

(57) ABSTRACT

According to one embodiment, an image processing device includes a detection circuit configured to detect a luminance range for each of a plurality of images captured with a different exposure time, a white balance processing circuit configured to separately perform white balance processing for each of the images based on the detected luminance range, and an image synthesis circuit configured to generate a synthetic image from the images in which the white balance processing is separately performed.

15 Claims, 8 Drawing Sheets

IMAGE PROCESSING DEVICE, DRIVE SUPPORTING SYSTEM, AND IMAGE PROCESSING METHOD

CROSS-REFERENCE TO RELATED APPLICATIONS

This application is based upon and claims the benefit of priority from Japanese Patent Application No. 2018-052933, filed Mar. 20, 2018, the entire contents of which are incorporated herein by reference.

FIELD

Embodiments described herein relate generally to an image processing device, a drive supporting system, and an image processing method.

BACKGROUND

In order to obtain a high dynamic range image having a wide range of luminance, it is known to perform a high dynamic range synthesis (HDRI: High Dynamic Range Imaging) by synthesizing a plurality of images captured by different exposure sensitivities. In addition, white balance processing is generally applied to the synthetic image. However, if the white balance processing is applied to the synthetic image, an image with unnatural color arrangement may be generated.

DETAILED DESCRIPTION

Figure 1:
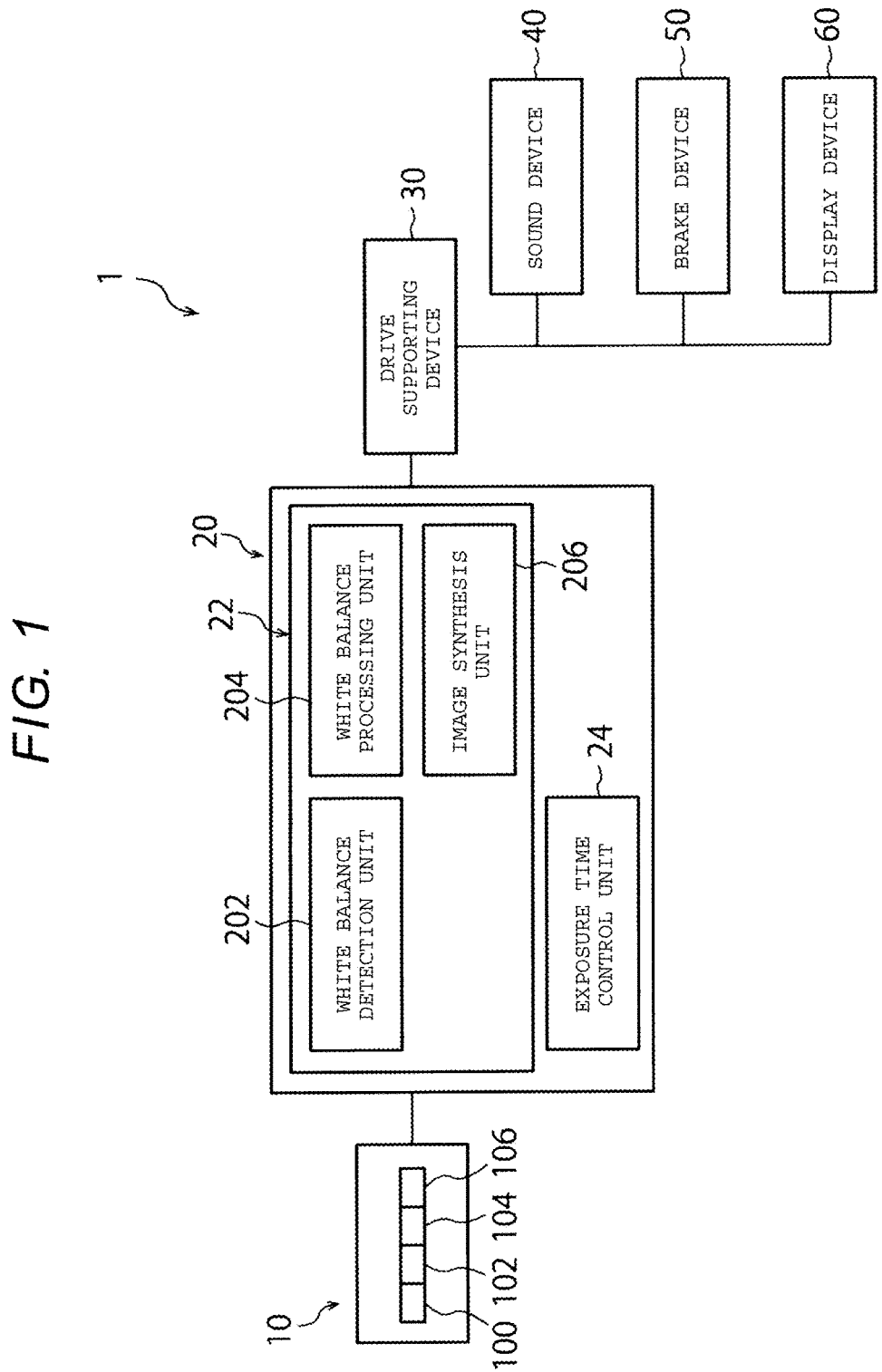
FIG. 1 is a block diagram illustrating an overall configuration of a drive supporting system according to a first embodiment.

Embodiments provide an image processing device, a drive supporting system, and an image processing method that perform white balance processing that enables a natural color arrangement even in a case where a high dynamic range synthesis is performed.

In general, according to one embodiment, an image processing device comprises a detection circuit configured to detect a luminance range for each of a plurality of images captured with a different exposure time, a white balance processing circuit configured to separately perform white balance processing for each of the images based on the detected luminance range, and an image synthesis circuit configured to generate a synthetic image from the images in which the white balance processing is separately performed.

Hereinafter, a drive support system according to an embodiment will be described in detail with reference to the drawings. The following embodiment is an example of embodiments of the present disclosure, and the present disclosure is not construed as being limited to the embodiments. In addition, in the drawings referred to in the present embodiment, the same reference numerals or similar symbols are attached to the same portions or portions having the same functions, and repetitive description thereof may be omitted in some cases. In addition, dimension ratios of the drawings may be different from actual ratios for the sake of convenient explanation, or some of the configuration may be omitted from the drawings.

First Embodiment

FIG. 1 is a block diagram illustrating an overall configuration of a drive supporting system 1 according to a first embodiment. As illustrated in FIG. 1, the drive supporting system 1 generates a synthetic image by a high dynamic range synthesis (HDRI: High Dynamic Range Imaging) and supports a driver to drive a vehicle. More specifically, the drive supporting system 1 includes a camera 10, an image-capturing control apparatus 20, a drive supporting device 30, a sound device 40, a brake device 50, and a display device 60.

The camera 10 is a device capable of acquiring a plurality of images having different exposure sensitivities, and includes a first to fourth cameras 100 to 106. The first camera 100 is, for example, an imaging sensor in which pixels are arranged in a two-dimensional planar shape and captures a first image in response to a control signal which includes a first exposure time T1 and is input from the image-capturing control apparatus 20. The imaging sensor is configured with a red (R) image-capturing device, a blue (B) image-capturing device, and a green (G) image-capturing device. Thereby, a red (R) image formed by a red (R) pixel, a blue (B) image formed by a blue (B) pixel, and a green (G) image formed by a green (G) pixel are captured as a first image. In the same manner, the second camera 102 has the same configuration as the first camera 100 and captures a second image in response to a control signal that includes a second exposure time T2 and is input from the image-capturing control apparatus 20. In the same manner, the third camera 104 has the same configuration as the first camera 100 and captures a third image in response to a control signal that includes a third exposure time T3 and is input from the image-capturing control apparatus 20. In the same manner, the fourth camera 106 includes the same configuration as the first camera 100 and captures a fourth image in response to a control signal that includes a fourth exposure time T4 and is input from the image-capturing control apparatus 20. For example, the exposure times T1-T4 have the following relationship: T4>T3>T2>T1. In the camera 10 according to the present embodiment, the exposure time is varied to make exposure sensitivities differ from each other, but the exposure sensitivity of a pixel may be different for each camera. In addition, the camera 10 may be configured with one imaging sensor and images of different exposure sensitivities in time series may be captured. For example, the camera 10 may be any device such as a compact digital camera or a smartphone as long as an image-capturing function is provided.

The image-capturing control apparatus 20 generates a synthetic image that is subjected to a high dynamic range synthesis and controls exposure time of the camera 10. The image-capturing control apparatus 20 includes a central processing unit (CPU). A detailed configuration of the image-capturing control apparatus 20 will be described below.

The drive supporting device 30 supports a driver to drive a vehicle according to an output signal of the image processing device 22. The drive supporting device 30 is connected to the sound device 40, a brake device 50, the display device 60, and the like.

The sound device 40 is, for example, a speaker, and is disposed near the driver's seat in the vehicle so that the driver can easily recognize the sound. The drive supporting device 30 controls the sound device 40 to output a guidance message, for example, "5 meters to an object", based on an output signal of the image processing device 22. Thereby, even in a case where, for example, the driver is distracted from driving, the driver's attention is improved by the guidance.

The brake device 50 is, for example, an auxiliary brake, and brakes vehicle based on an output signal of the image processing device 22. For example, in a case where the vehicle approaches to within a predetermined distance of an object, for example, three meters, the drive supporting device 30 causes the brake device 50 to brake the vehicle.

The display device 60 is, for example, a liquid crystal monitor, and displays an image based on the output signal of the image processing device 22. Thereby, even when there is, for example, backlight, external information can be more accurately grasped by referring to an image displayed on the display device 60.

Here, a detailed configuration of the image-capturing control apparatus 20 will be described. The image-capturing control apparatus 20 includes an image processing device 22 and an exposure time control unit 24.

The image processing device 22 synthesizes a synthetic image whose exposure sensitivity is adjusted based on a plurality of images subjected to white balance processing. The image processing device 22 includes a white balance detection unit 202, a white balance processing unit 204, and an image synthesis unit 206. In an embodiment, each of the units 202, 204, and 206 is formed as an electrical circuit. Alternatively, one or more of the units may be implemented by software components loaded onto a memory and executed by a processor.

Figure 2:
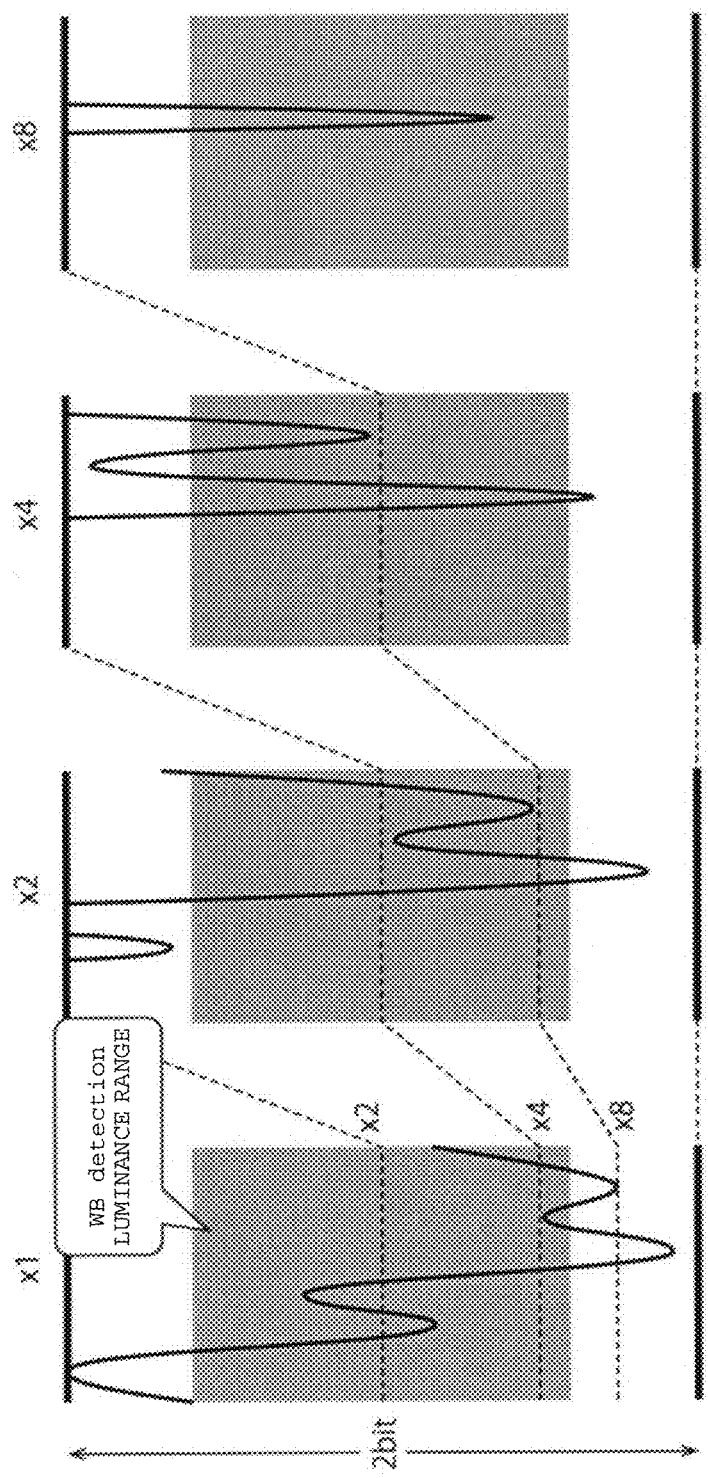
FIG. 2 is a conceptual diagram illustrating a luminance range in which image information to be subjected to white balance processing is acquired.

FIG. 2 is a conceptual diagram illustrating a luminance range in which image information to be subjected to white balance processing is acquired, and illustrates profiles on the same line in the first to fourth images. A vertical axis denotes a luminance value, and a horizontal axis denotes coordinates on the same line placed in the images. In addition, a gray rectangle represents a luminance range in which image information is acquired. For example, a range of the rectangle represents a luminance value in the range of 20% to 80% from the bottom of the dynamic range of each image. In the high dynamic range synthesis, for example, pixel values in the range of the quadrangle are preferentially added. For example, a weight value at the time of addition is changed by the pixel value within the range of the rectangle and the pixel value out of the range. For example, the weight value of the pixel value within the range of the rectangle is 1.0, and the weight value of the pixel value within the range of the rectangle is 0. Here, the weight value means a coefficient to be multiplied by the luminance value, and if the weight value is 0, it means that the luminance value is not added.

In addition, the profile denoted by "×1" is a profile of the first image having the exposure time of, for example, 5 milliseconds, the profile denoted by "×2" is a profile of the second image having exposure time of, for example, 10 milliseconds, the profile denoted by "×4" is a profile of the third image having the exposure time of, for example, 20 milliseconds, and the profile denoted by "×8" is a profile of the fourth image having exposure time of, for example, 40 milliseconds. For example, when the synthetic image is generated, the luminance value of the first image is multiplied by 8, the luminance value of the second image is multiplied by 4, the luminance value of the third image is doubled, and the luminance value of the fourth image is multiplied by 1. The luminance ranges at the time of the synthesis are denoted by dotted lines from "×2" to "×8" in the images. That is, the range below the dotted line of "×8" is equal to the luminance range of the fourth image at the time of synthesis, the range below the dotted line of "×4" is equal to the luminance range of the third image at the time of synthesis, the range below the dotted line of "×2" is equal to the luminance range of the second image at the time of synthesis.

As can be seen from these, after the luminance range is adjusted, a detection range of the fourth image according to the present embodiment is on the lowest luminance side, and a detection range of the third image is on a luminance side that is twice the detection range of the fourth image and is higher than the detection range of the fourth image. In the same manner, a detection range of the second image is on a luminance side that is twice the detection range of the third image and is higher than the detection range of the third image. In the same manner, a detection range of the first image is on a luminance side that is twice the detection range of the second image and is higher than the detection range of the second image. The detection range of luminance is not limited to the above-described ranges and may be set to any range.

In this way, the white balance detection unit 202 detects a luminance range in which image information for being subjected to the white balance processing is acquired for each of a plurality of images having different exposure times. Thereby, it is possible to perform the white balance processing by using image information within the luminance range mainly used at the time of image synthesis. The white balance detection unit 202 according to the present embodiment corresponds to a detection unit.

The white balance processing unit 204 performs the white balance processing on a plurality of images having different exposure sensitivities. More specifically, the white balance processing unit 204 performs the white balance processing on the plurality of images having different exposure sensitivities by using image information of a luminance value within a range detected by the white balance detection unit 202. The white balance processing unit 204 performs white balance correction processing on the first to fourth images, based on the image information of the luminance value within the range detected by the white balance detection unit 202, that is, a red (R) pixel value, a blue (B) pixel value, and a green (G) pixel value. The luminance value can be calculated by a general conversion formula, based on the red (R) pixel value, the blue (B) pixel value, and the green (G)

pixel value. In other words, the range of the luminance value of each image is calculated based on the red (R) pixel value, the blue (B) pixel value, and the green (G) pixel value.

The white balance processing unit 204 corrects the red (R) pixel value, the blue (B) pixel value, and the green (G) pixel value such that the entire image of the luminance value within the range detected by the white balance detection unit 202 becomes an achromatic color. In the white balance processing, general processing removing so-called color cast caused by a type of light source may be used. To make an achromatic color here means to remove the color cast.

The image synthesis unit 200 synthesizes a synthetic image whose exposure sensitivity is adjusted, based on a plurality of images subjected to the white balance processing by the white balance processing unit 204. For example, with respect to the first image captured with the first exposure time T1, a synthetic magnification is set to T4/T1, for example, eight times. In the same manner, with respect to the second image captured with the second exposure time T2, the synthetic magnification is set to T4/T2, for example, four times. In the same manner, with respect to the third image captured with the third exposure time T3, the synthetic magnification is set to T4/T3, for example, two times. In a case where the luminance range is changed by the white balance processing performed by the white balance processing unit 204, a synthetic image whose exposure sensitivity is adjusted may be synthesized after the luminance range is readjusted.

The exposure time control unit 24 generates a control signal including the exposure times T1 to T4 and controls the camera 10. For example, in a case where an average luminance of the first image is higher than a target value, the exposure time control unit 24 makes the first exposure time T1 shorter than the current first exposure time T1 such that the average luminance decreases. Meanwhile, in a case where the average luminance of the first image is lower than the target value, the exposure time control unit 24 makes the first exposure time T1 longer than the current first exposure time T1 such that the average luminance increases. In the same manner, the exposure time control unit 24 sets the exposure times T2 to T4 such that the average luminance of each of the second to fourth images approaches the target value. In an embodiment, the exposure time control unit 24 is an electrical circuit. Alternatively, the exposure time control unit 24 may be implemented by a software component loaded onto a memory and executed by a processor.

Figure 3:
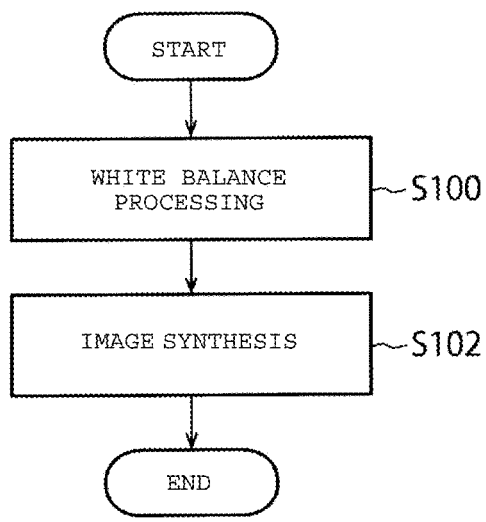
FIG. 3 is a flowchart illustrating a processing example of an image processing device.
Figure 4:
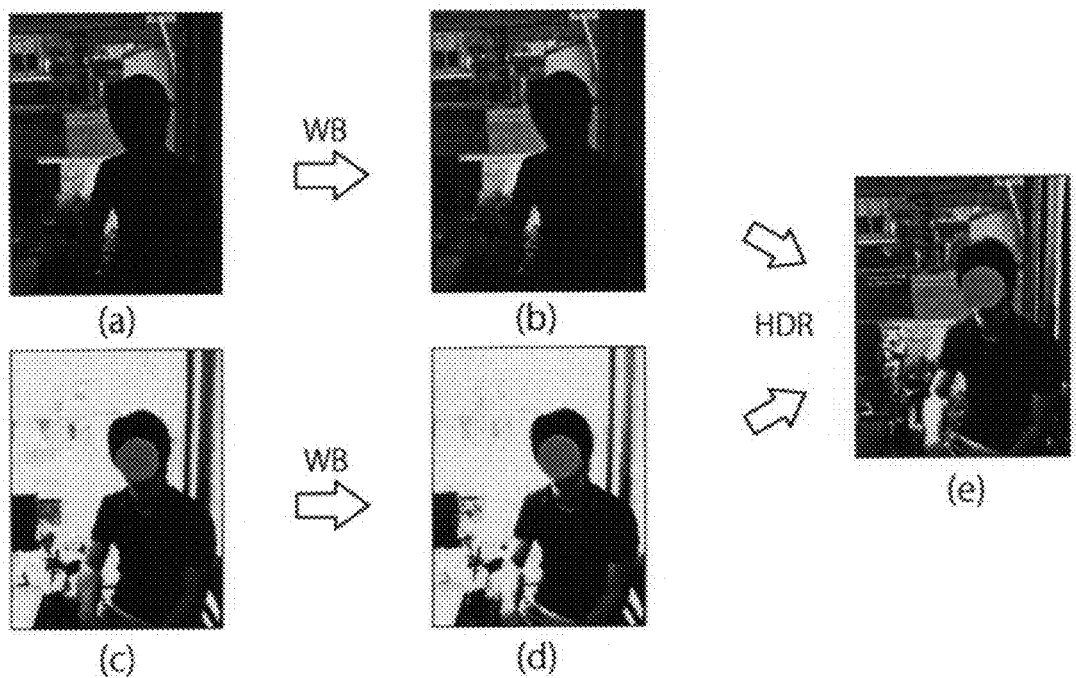
FIG. 4 is a diagram illustrating an example of image processing according to the flowchart illustrated in FIG. 3.
Figure 5:
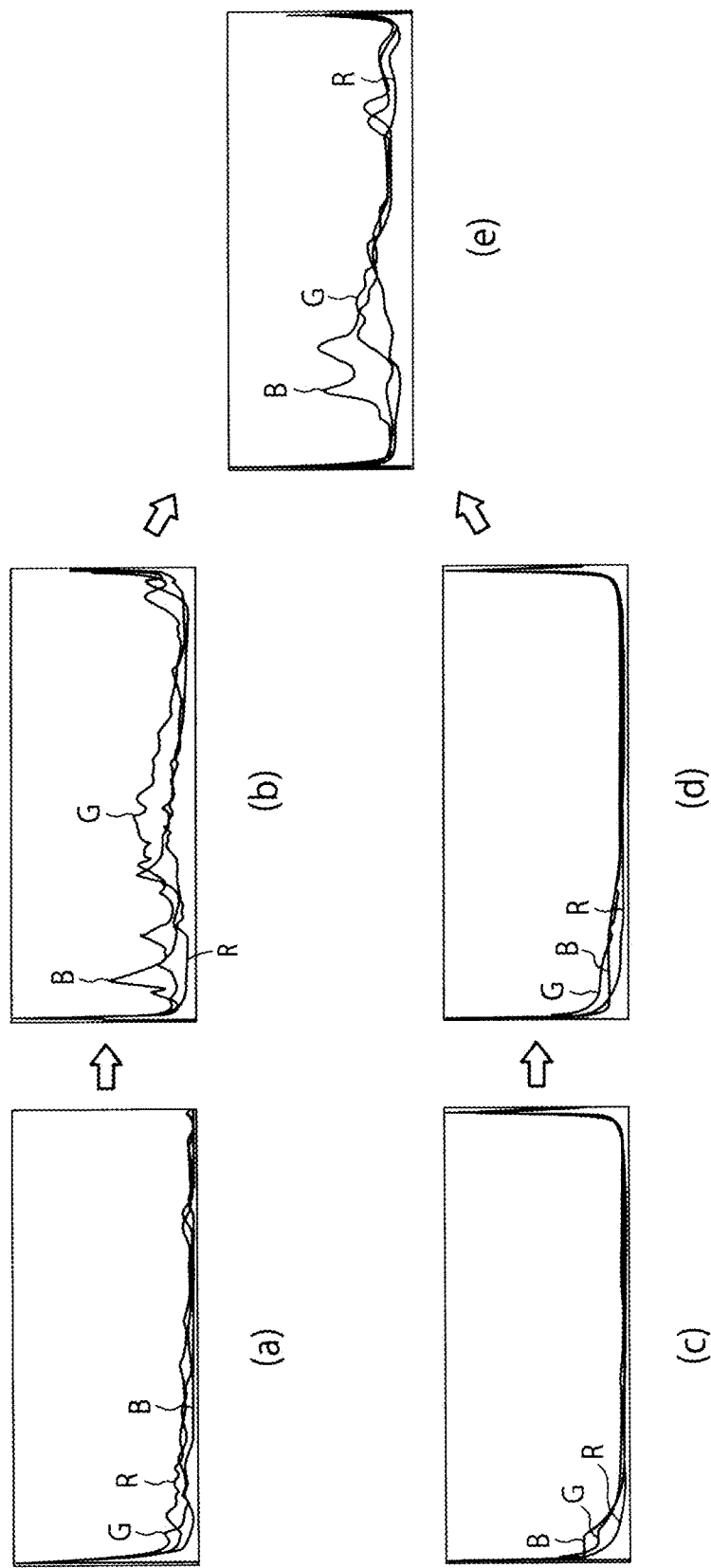
FIG. 5 is a diagram illustrating histograms of the images illustrated in FIG. 4.

FIG. 3 is a flowchart illustrating a processing example of the image processing device 22. Here, the processing example will be described in which the first image of the first exposure time T1 and the second image of the second exposure time T2 are used. FIG. 4 is a diagram illustrating an example of image processing according to the flowchart illustrated in FIG. 3. Part (a) of FIG. 4 illustrates the first image before the white balance processing, and part (b) of FIG. 4 illustrates the first image after the white balance processing. Part (c) of FIG. 4 illustrates the second image before the white balance processing, and part (d) of FIG. 4 illustrates the second image after the white balance processing. Part (e) of FIG. 4 illustrates a synthetic image of the first image after the white balance processing and the second image after the white balance processing. FIG. 5 is a diagram illustrating histograms of the images illustrated in FIG. 4. A horizontal axis denotes the pixel value, and a vertical axis denotes the number of pixels. Parts (a) to (e) of FIG. 5 are histograms of images illustrated in parts (a) to (e) of FIG. 4, respectively.

As illustrated in FIG. 3, the white balance detection unit 202 detects a predetermined first luminance value range of the first image captured by the camera 10 and a predetermined second luminance value range of the second image. The luminance range detected by the white balance detection unit 202 corresponds to a background portion mainly excluding a person in the first image and corresponds to a person portion mainly excluding a background in the second image. Subsequently, the white balance processing unit 204 performs gain correction on the red (R) pixel value and the blue (B) pixel value, such that the pixels within the first luminance value range of the first image detected by the white balance detection unit 202 and the pixels within the second luminance value range of the second image become achromatic colors, and performs the white balance processing (step S100). As a result of the white balance processing, the background portion mainly becomes an achromatic color in the first image and the person portion mainly becomes an achromatic color in the second image.

Next, the image synthesis unit 200 synthesizes the synthetic image whose exposure sensitivity is adjusted, based on the first image and the second image subjected to the white balance processing by the white balance processing unit 204 (step S102).

As described above, according to the present embodiment, a synthetic image whose exposure sensitivity is adjusted is generated based on the image subjected to the white balance processing by the white balance processing unit 204. Thereby, before the synthetic image is generated, a white balance of each image is adjusted and achromatized, and thereby, a color arrangement of the synthetic image can also be achromatized.

Second Embodiment

The white balance detection unit 202 according to the first embodiment determines a range of the detected luminance value in advance. A white balance detection unit 202b according to the present embodiment is different from the white balance detection unit 202 in that a range of the detected luminance value is changed depending on distribution of luminance values of the respective images. Hereinafter, points different from the white balance detection unit 202 according to the first embodiment will be described. Since a configuration of the image processing device 22 is the same as the configuration of the image processing device according to the first embodiment, description thereof will be omitted.

Figure 6:
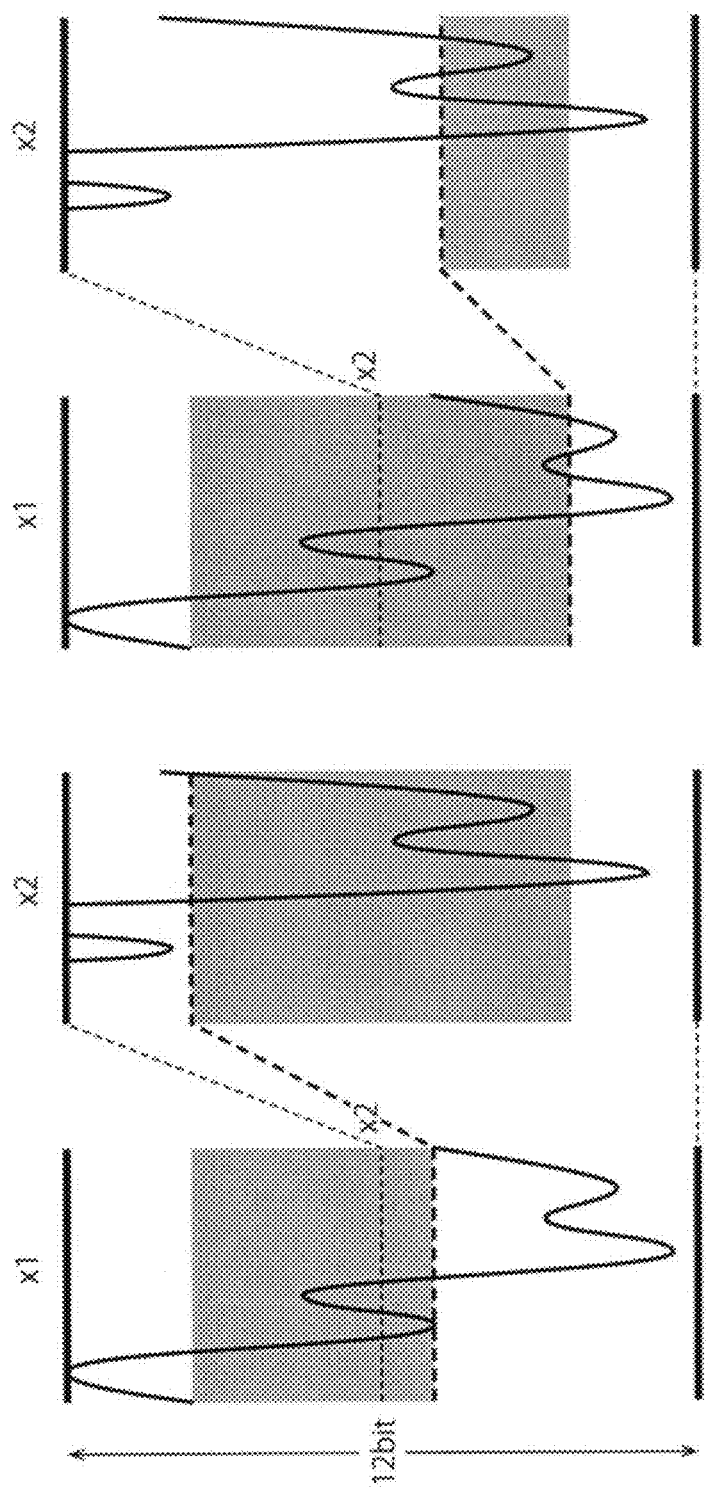
FIG. 6 is a conceptual diagram illustrating a range in which the white balance processing is performed in a case where two images are synthesized.

FIG. 6 is a conceptual diagram illustrating a range to be subjected to the white balance processing in a case where two images are synthesized, and illustrates profiles on the same line in the first image and the second image. A vertical axis denotes the luminance value, and a horizontal axis denotes coordinates on the line placed in the image. The profile denoted by "×1" is a profile of the first image having the exposure time of, for example, 5 milliseconds, and the profile denoted by "×2" is a profile of the second image having the exposure time of, for example, 10 milliseconds.

In synthesizing the first image and the second image on the left side, the white balance detection unit 202b determines a luminance value range with reference to a luminance value distribution of the first image (a short exposure frame). More specifically, the white balance detection unit 202b limits the luminance value range of the first image to the brighter side. For example, the white balance detection unit 202b sets a value greater than or equal to the luminance value of a 40% point between the maximum luminance value and the minimum luminance value in the first image as the luminance value range of the first image. For example, the luminance value of the 40% point means 40 in a case where the maximum luminance value in the first image is 100 and the minimum luminance value in the first image is 0. In this case, the luminance value range of the second image is determined based on a lower limit value of the luminance value range of the first image. In a case where such processing is performed, it is possible to obtain a synthetic image in which a white balance of the image on the high luminance side of the first image is further emphasized.

Meanwhile, in synthesizing the first image and the second image on the right side, the white balance detection unit 202b determines a luminance value range with reference to a luminance value distribution of the second image (a long exposure frame). More specifically, the white balance detection unit 202b limits the luminance value range of the second image to a dark side. For example, the white balance detection unit 202b sets a value less than or equal to the luminance value of a 30% point between the maximum luminance value and the minimum luminance value in the second image as the luminance value range of the first image. In this case, the luminance value range of the first image is determined based on an upper limit value of the luminance value range of the second image. In a case where such processing is performed, it is possible to obtain a synthetic image in which a white balance on a low luminance side of the second image is further emphasized.

Figure 7:
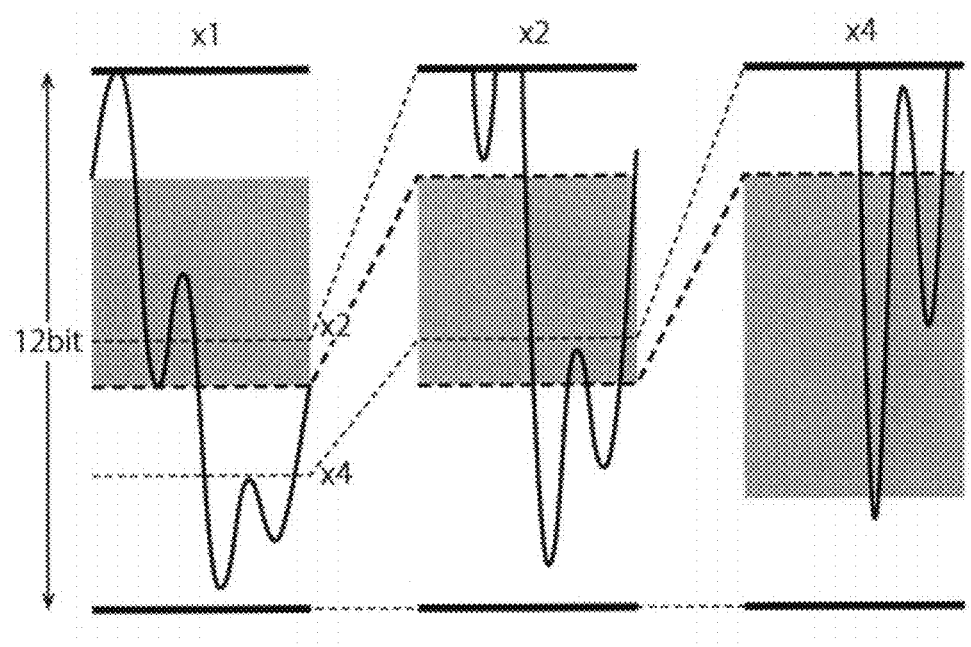
FIG. 7 is a conceptual diagram illustrating a range in which the white balance processing is performed in a case where three images are synthesized.

FIG. 7 is a conceptual diagram illustrating a range to be subjected to the white balance processing in a case where three images are synthesized, and illustrates profiles on the same line in the first to third images. A vertical axis denotes the luminance value, and a horizontal axis denotes coordinates on the line placed in the image. The profile denoted by "×1" is a profile of the first image having the exposure time of, for example, 5 milliseconds, the profile denoted by "×2" is a profile of the second image having the exposure time of, for example, 10 milliseconds, and the profile denoted by "×4" is a profile of the third image having the exposure time of, for example, 20 milliseconds.

The white balance detection unit 202b determines the luminance value range with reference to the luminance value distribution of the first image (a first short exposure frame) and the second image (a second short exposure frame). More specifically, the white balance detection unit 202b limits the luminance value ranges of the first image and the second image to a bright side. For example, the white balance detection unit 202b sets a value greater than or equal to the luminance value of the 40% point between the maximum luminance value and the minimum luminance value in the first image as the luminance value range of the first image. In the same manner, the white balance detection unit 202b sets a value greater than or equal to the luminance value of the 40% point between the maximum luminance value and the minimum luminance value in the second image as the luminance value range of the second image. In this case, the upper limit value of the luminance value range of the second image is determined based on the lower limit value of the luminance value range of the first image.

In addition, an upper limit value of a luminance value range of the third image (a long exposure frame) is determined based on a lower limit value of the luminance value range of the second image. When such processing is performed, it is possible to obtain a synthetic image in which white balances of images on the high luminance sides of the first image and the second image are emphasized.

Figure 8:
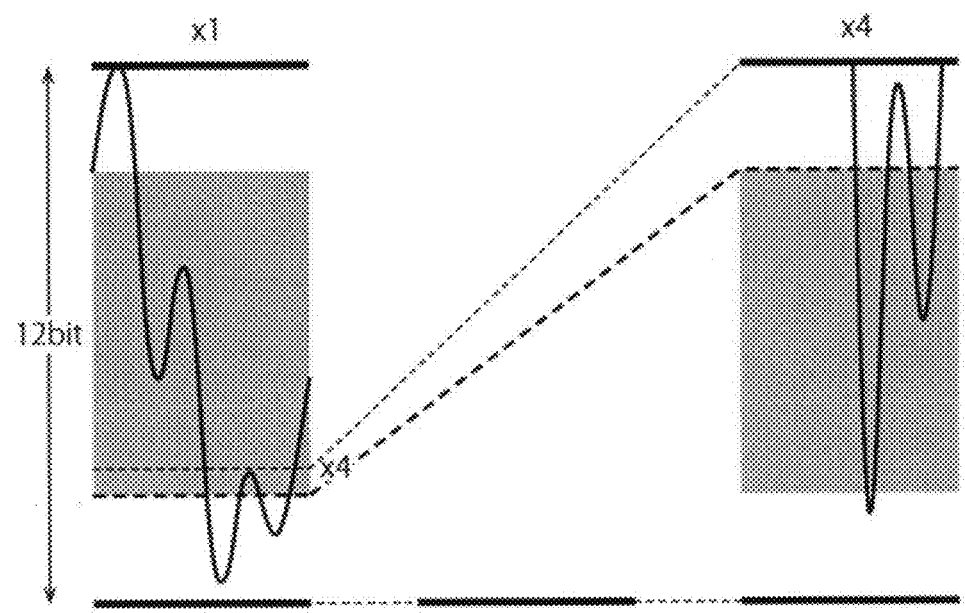
FIG. 8 is a diagram illustrating profiles on the same line in a first image and a third image.

FIG. 8 is a conceptual diagram illustrating a range to be subjected to the white balance processing in a case where two images are synthesized, and illustrates profiles on the same lines in the first image and the third image. A vertical axis denotes the luminance value, and a horizontal axis represents the coordinates on the lines placed in the images. The profile denoted by "×1" is a profile of the first image having the exposure time of, for example, 5 milliseconds, and the profile denoted by "×4" is a profile of the third image having the exposure time of, for example, 20 milliseconds.

The white balance detection unit 202b limits the luminance value range of the first image to a brighter side. For example, the white balance detection unit 202b sets a value greater than or equal to a luminance value of a 20% point between the maximum luminance value and the minimum luminance value in the first image as the luminance value range of the first image. In this case, a luminance value range of the third image is determined based on the lower limit value of the luminance value range of the first image. In a case where such processing is performed, it is possible to obtain a synthetic image in which the white balance on the high luminance side of the first image is further emphasized.

As described above, according to the present embodiment, the white balance detection unit 202b detects a luminance range of another image with reference to a luminance range of a specific image among a plurality of images having different exposure sensitivities. Thereby, it is possible to obtain a synthetic image in which a white balance of a luminance range of the specific image is further emphasized.

Third Embodiment

The white balance detection unit 202 according to the first embodiment determines a range of the detected luminance value in advance. A white balance detection unit 202c according to the present embodiment is different from the white balance detection unit 202 in that the number of images and a luminance range used for the white balance processing are changed, based on a representative value of the luminance values of each of a plurality of images having different exposure sensitivities. Hereinafter, points different from the white balance detection unit 202 according to the first embodiment will be described. Since a configuration of the image processing device 22 is the same as the configuration of the image processing device according to the first embodiment, description thereof will be omitted.

Figure 9:
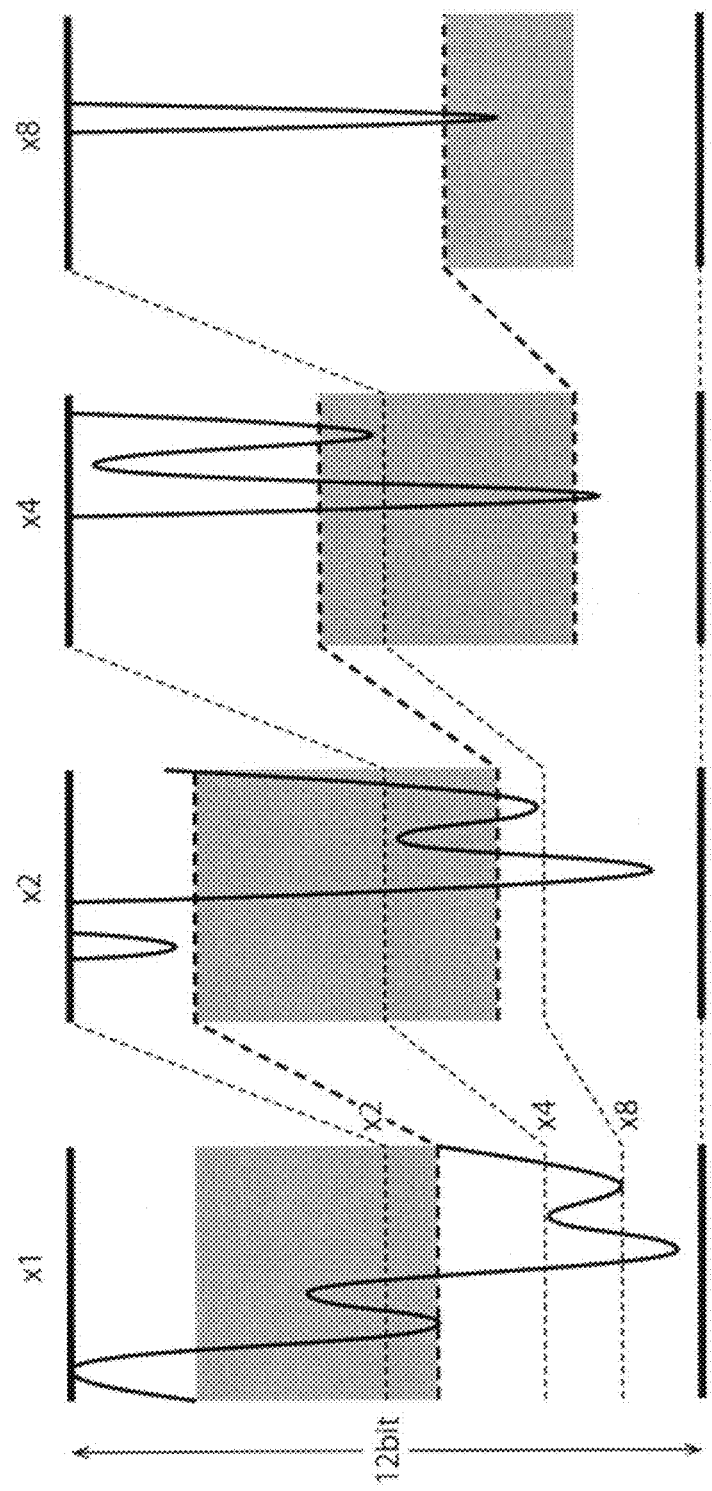
FIG. 9 is a conceptual diagram illustrating determining a luminance range, based on a representative value of luminance values.

FIG. 9 is a conceptual diagram determining a luminance range, based on a representative value of the luminance values of each of a plurality of images having different exposure sensitivities. A vertical axis denotes the luminance value, and a horizontal axis denotes coordinates on the line placed in the image. The profile denoted by "×1" is a profile of the first image having the exposure time of, for example, 5 milliseconds, the profile denoted by "×2" is a profile of the second image having the exposure time of, for example, 10 milliseconds, the profile denoted by "×4" is a profile of the third image having the exposure time of, for example, 20 milliseconds, and the profile denoted by "×8" is a profile of the third image having the exposure time of, for example, 40 milliseconds.

As illustrated in FIG. 9, the white balance detection unit 202c detects the luminance range, based on the representative value of the luminance values of each of the plurality of images having different exposure sensitivities. For example, the white balance detection unit 202c detects the luminance value range of the first image, based on the average luminance value of the first image. In the same manner, the white balance detection unit 202c detects the luminance value range of the second image, based on the average luminance value of the second image. In this case, the upper limit value of the luminance value range of the second image is determined based on the lower limit value of the luminance value range of the first image. In the same manner, the white balance detection unit 202c detects a luminance value range of the third image, based on an average luminance value of the third image. In this case, an upper limit value of the luminance value range of the third image is determined based on the lower limit value of the luminance value range of the second image. The white balance detection unit 202c detects a luminance value range of the fourth image, based on a lower limit value of the luminance value range of the third image. A value acquired for controlling the exposure time of the camera 10 may be used by the exposure time control unit 24 (FIG. 1) as a representative value of luminance values of each of a plurality of images having different exposure sensitivities. For example, the representative value of the luminance values of the plurality of images having different exposure sensitivities is an average value of the luminance values, an intermediate value of the luminance values, or the like.

Figure 10:
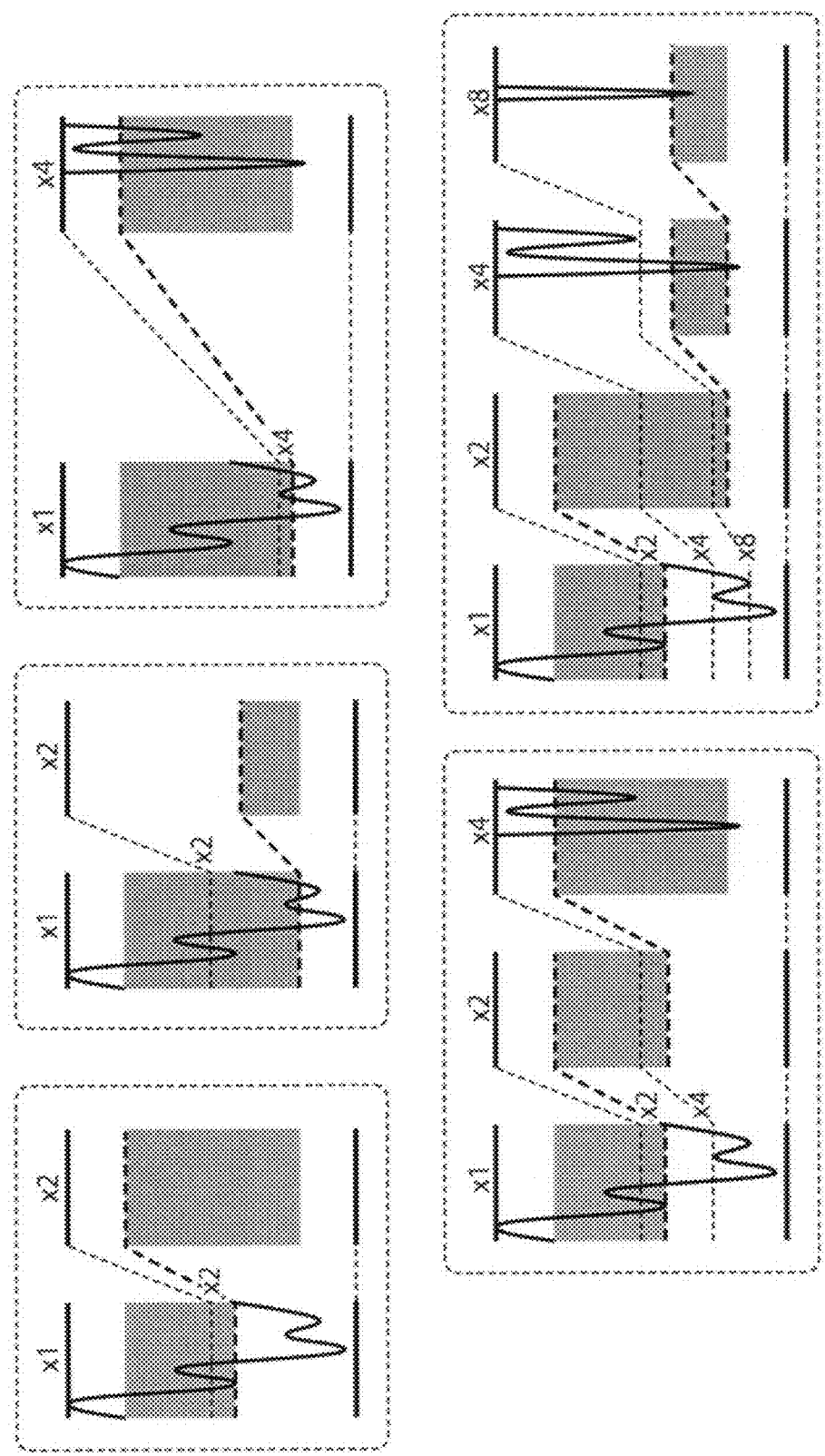
FIG. 10 is a conceptual diagram when an image used for image synthesis is selected and a luminance value range is set.

FIG. 10 is a conceptual diagram when an image used for image synthesis and a luminance value range used for the white balance processing are set. FIG. 10 illustrates a profile example of an image in which a frame surrounded by each dotted line is selected for image synthesis. As illustrated in FIG. 10, the white balance detection unit 202c sets an image used for generating a synthesis image and a luminance value range used for the white balance processing, based on a representative value of luminance values of each of a plurality of images having different exposure sensitivities. For example, the white balance detection unit 202c determines overlap of the luminance value distributions of the respective images from the respective average luminance values of the first to fourth images, the maximum luminance value and the minimum luminance value of each image, and the like, and selects an image to be used for generation of the synthesis image.

As described above, the white balance detection unit 202c according to the present embodiment sets an image used for generating a synthesis image and a luminance value range used for the white balance processing, based on representative values of luminance values of a plurality of images having different exposure sensitivities. Thereby, an image suitable for a luminance value distribution of an image captured by the camera 10 can be selected to generate a synthetic image, and the white balance processing suitable for the luminance value distribution of each image can be performed.

Although an image processing device and an image processing method according to the above-described embodiments are described by using a drive supporting system as an example, the present disclosure is not limited to this and may be used for image processing of medicine, a drone, an industrial robot, a smartphone, and the like.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing device comprising:
    a detection circuit configured to:
        determine a first luminance range of a first image captured with a first exposure time, and
        determine a second luminance range of a second image captured with a second exposure time based on:
            a lower limit luminance value of the determined first luminance range when the second exposure time is longer than the first exposure time and
            an upper limit luminance value of the determined first luminance range when the second exposure time is shorter than the first exposure time;
    a white balance processing circuit configured to separately perform white balance processing for the first and second images using the detected first and second luminance ranges, respectively; and
    an image synthesis circuit configured to generate a synthetic image from the first and second images in which the white balance processing is separately performed.

2. The image processing device according to claim 1, wherein
    the white balance processing circuit is configured to perform the white balance processing on the first image based on the first luminance range and perform the white balance processing on the second image based on the second luminance range.

3. The image processing device according to claim 1, wherein
    when the second exposure time is longer than the first exposure time, an upper limit luminance value of the second luminance range is equal to the lower limit luminance value of the first luminance range multiplied by the second exposure time divided by the first exposure time.

4. The image processing device according to claim 1, wherein
    when the second exposure time is shorter than the first exposure time, a lower limit luminance value of the second luminance range is equal to the upper limit luminance value of the first luminance range multiplied by the second exposure time divided by the first exposure time.

5. The image processing device according to claim 1, wherein
    the second luminance range is broader than the first luminance range.

6. A drive supporting system for a vehicle, comprising:
    the image processing device according to claim 1; and
    a drive supporting device configured to display the generated synthetic image that indicates a view around the vehicle.

7. An image capturing control apparatus configured to connect with one or more cameras, comprising:
    an exposure time control circuit configured to control the cameras to capture a first image and a second image with a first exposure time and a second exposure time, respectively;
    a detection circuit configured to:
        determine a first luminance range of the first image, and
        determine a second luminance range of the second image based on:

a lower limit luminance value of the determined first luminance range when the second exposure time is longer than the first exposure time and an upper limit luminance value of the determined first luminance range when the second exposure time is shorter than the first exposure time;

a white balance processing circuit configured to separately perform white balance processing for the first and second images using the detected first and second luminance ranges, respectively; and an image synthesis circuit configured to generate a synthetic image from the first and second images in which the white balance processing is separately performed.

8. The image capturing control apparatus according to claim 7, wherein when the second exposure time is longer than the first exposure time, an upper limit luminance value of the second luminance range is equal to the lower limit luminance value of the first luminance range multiplied by the second exposure time divided by the first exposure time.

9. The image capturing control apparatus according to claim 7, wherein when the second exposure time is shorter than the first exposure time, a lower limit luminance value of the second luminance range is equal to the upper limit luminance value of the first luminance range multiplied by the second exposure time divided by the first exposure time.

10. The image capturing control apparatus according to claim 7, wherein the second luminance range is broader than the first luminance range.

11. An image processing method carried out by an image processing device, the method comprising:

determining a first luminance range of a first image captured with a first exposure time;

determining a second luminance range of a second image captured with a second exposure time based on:

a lower limit luminance value of the determined first luminance range when the second exposure time is longer than the first exposure time and an upper limit luminance value of the determined first luminance range when the second exposure time is shorter than the first exposure time;

separately performing white balance processing for the first and second images using the determined first and second luminance ranges, respectively; and generating a synthetic image from the first and second images in which the white balance processing is separately performed.

12. The image processing method according to claim 11, wherein said performing comprises:

performing the white balance processing on the first image based on the first luminance range and performing the white balance processing on the second image based on the second luminance range.

13. The image processing method according to claim 11, wherein when the second exposure time is longer than the first exposure time, an upper limit luminance value of the second luminance range is equal to the lower limit luminance value of the first luminance range multiplied by the second exposure time divided by the first exposure time.

14. The image processing method according to claim 11, wherein when the second exposure time is shorter than the first exposure time, a lower limit luminance value of the second luminance range is equal to the upper limit luminance value of the first luminance range multiplied by the second exposure time divided by the first exposure time.

15. The image processing method according to claim 11, wherein the second luminance range is broader than the first luminance range.

* * * * *